F. O. HOWE.
ARTIFICIAL BAIT.
APPLICATION FILED OCT. 20, 1908.

935,657.

Patented Oct. 5, 1909.

Inventor
Francis O. Howe

Witnesses

By Victor J. Evans
Attorney

UNITED STATES PATENT OFFICE.

FRANCIS O. HOWE, OF NORTH MANCHESTER, INDIANA.

ARTIFICIAL BAIT.

935,657.

Specification of Letters Patent.

Patented Oct. 5, 1909.

Application filed October 20, 1908. Serial No. 458,623.

*To all whom it may concern:*

Be it known that I, FRANCIS O. HOWE, a citizen of the United States of America, residing at North Manchester, in the county of Wabash and State of Indiana, have invented new and useful Improvements in Artificial Bait, of which the following is a specification.

This invention relates to artificial bait, and one of the principal objects of the same is to provide a casting bait which when drawn through the water will accurately simulate the movements of a live minnow.

Another object of the invention is to provide an artificial bait which when cast and drawn through the water will skip or alternately rise and fall to the surface to simulate the action of a minnow and when drawn through the water will form a wake similar to that made by a fish.

Still another object of the invention is to provide an artificial bait made of light material to which a series of hooks are attached by swivels so that after the fish has been impaled upon one of the hooks he cannot escape nor in any manner disgorge the hook, owing to the fact that the hook will yield in all directions.

These and other objects may be attained by means of the construction illustrated in the accompanying drawing, in which,—

Figure 1:
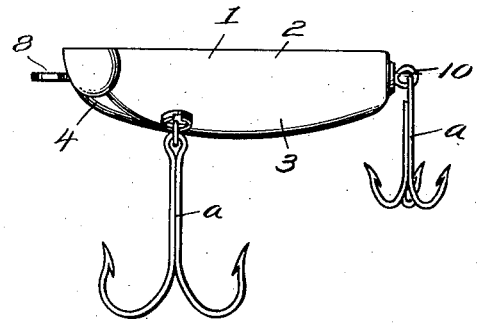
Figure 2:
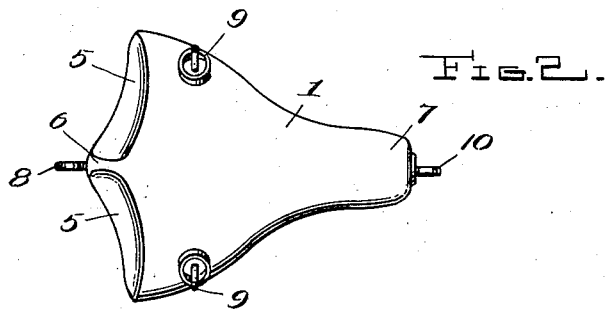
Figure 3:
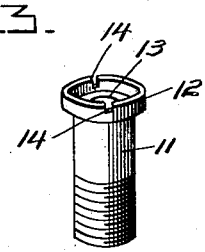
Figure 4:
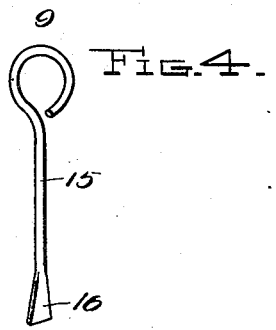

Figure 1 is a side elevation of an artificial bait made in accordance with my invention. Fig. 2 is a bottom plan view of the bait with the hooks removed. Fig. 3 is a detail perspective view of the tubular swivel socket. Fig. 4 is a similar view of the swivel.

Referring to the drawing, the numeral 1 designates the body portion of the bait provided with a substantially plain upper surface or top 2 and a longitudinally and transversely curved under surface which is curved upwardly toward the front, as at 4, and at the front two oppositely disposed divergent grooves 5 are provided, said grooves being divided by a wall or partition 6 disposed centrally of the body portion of the bait. As shown in Fig. 2 the front portion of the body 1 is comparatively wide, while the rear portion 7 is quite narrow. A ring 8 is secured in the front end of the body 1 for the attachment of the line, and at opposite sides of the bait body 1 hook swivels 9 are provided, while in the rear a ring 10 is connected to the body 1.

The swivels 9 each consist of a tubular threaded member 11 provided with an enlarged head 12, said tubular member being seated in a socket formed in the body 1 of the bait and provided with a contracted inner tubular portion 13. The head 1 is provided with oppositely disposed notches 14 to accommodate a spanner for turning the member 11 into the bait body. The hook swivels 9 and 10 are each provided with a shank 15 having a flattened terminal end 16. The end 16 is spread after it is connected with the tubular portion 13 of the member 11, and by this means is prevented from withdrawal from said member, while at the same time it is permitted to turn freely within the tubular portion 13.

In use my artificial bait is cast upon the water, and by short quick movements of the rod the bait is drawn through the water, and owing to the oppositely disposed grooves 5 a wake is formed in the water which simulates that of a live fish. By proper manipulation of the rod the bait may be made to skip over the surface of the water owing to the curved surfaces 3 and 4 at the bottom of the bait body. It is to be understood that the bait body 1 is made of a comparatively light material which can be made to either partially sink under the surface or to skip over the top of the water, as desired.

From the foregoing it will be obvious that my artificial bait may be readily manipulated to simulate the appearance of a live fish and can be manipulated in various ways to lure a game fish. Moreover, after the fish has been impaled upon one of the hooks *a* it cannot readily detach itself owing to the fact that the hooks are swiveled, and each movement of the fish will carry the hook with it and not permit a twisting strain upon the hooks.

I claim:—

1. An artificial bait comprising a body having a curved under surface, an upwardly curved front end, a rearwardly inclined diverging groove at each side of the center of the front portion of said body, swivels connected to said body, and fish hooks attached to said swivels.

2. An artificial bait comprising a body having a curved under surface, an upwardly curved front end, a rearwardly inclined diverging groove at each side of the center of the front portion of said body, and fish hooks connected to said body.

In testimony whereof I affix my signature in presence of two witnesses.

FRANCIS O. HOWE.

Witnesses:
IVA SNIDEMAN,
CHARLES OLINGER.